United States Patent [19]

Nakagawa

[11] Patent Number: 4,952,964
[45] Date of Patent: Aug. 28, 1990

[54] CAMERA SYSTEM

[75] Inventor: Tadashi Nakagawa, Chiba, Japan

[73] Assignee: Seikosha Co., Ltd., Tokyo, Japan

[21] Appl. No.: 339,040

[22] Filed: Apr. 17, 1989

[30] Foreign Application Priority Data

Apr. 27, 1988 [JP] Japan .................. 63-105279

[51] Int. Cl.$^5$ ................................. G03B 3/00
[52] U.S. Cl. .................................. 354/402; 354/232; 354/272
[58] Field of Search ................. 354/400–409, 354/232, 272, 412, 195.1; 250/201, 204

[56] References Cited

U.S. PATENT DOCUMENTS 4,377,330 3/1983 Stauffer .......................... 354/405
4,853,731 8/1989 Tsujimura et al. ............... 354/400

Primary Examiner—L. T. Hix
Assistant Examiner—David M. Gray
Attorney, Agent, or Firm—Jordan and Hamburg

[57] ABSTRACT

In a camera system for use in a camera of the type having a lens, a lens shutter, and automatic focusing utilizing the light transmitted through the lens, a light-blocking device is provided ahead of the image plane to be photographed and moveable between blocking and non-blocking positions, and a control device is operable upon manual actuation of the camera to open the shutter and provide for automatic focus adjustment utilizing the light transmitted through the lens, the control device further being operable to move the light-blocking device to its blocking position when the shutter is opened to provide for automatic focus adjustment and to subsequently move the light-blocking device to its non-blocking position to provide for exposure operation of the shutter to expose the film in the camera.

11 Claims, 3 Drawing Sheets

CAMERA SYSTEM

FIELD OF THE INVENTION

The present invention relates to a control system for use in an autofocus camera equipped with a lens shutter.

BACKGROUND OF THE INVENTION

A popular autofocus camera having a lens shutter performs automatic focus detection which generally relies on the principles of triangulation near the viewfinder in a path differing from the photographical path. In practice, the camera lens is set at a given position according to the results of the detection.

Meanwhile, a single lens reflex (SLR) camera equipped with a focal-plane shutter automatically adjusts the focus with high accuracy, because the error associated with the lens-driving portion is accommodated, which arises from the fact that the lens is brought into focus by focusing the light rays which pass through the lens.

On the other hand, a camera having a lens shutter is more advantageous than SLR cameras in flash photography. Further, the former camera is excellent in portability. Therefore, cameras having a lens shutter have enjoyed wide acceptance.

In recent years, multifocal cameras and cameras having a zoom lens have gained popularity. With these cameras, a method adopted to bring the camera lens into focus involves measuring the distance externally when the lens is used at a longer focal point. The camera lens is focused according to the obtained value. In this method, errors arising during setting and errors intrinsically present in the lens system cannot be neglected. Hence, each step of the manufacturing process requires that adjustments be made with excessively high accuracy.

In view of the foregoing, the invention seeks to provide a camera which has a lens shutter but provides automatic focus adjustment equivalent to the adjustment in an SLR camera, thereby accurately adjusting the focus.

In a camera equipped with a lens shutter, the optical path of the camera lens is closed before operation. Therefore, it is impossible to know whether the light rays transmitted through the optical path are focused.

Accordingly, the provision of a separate means which shields the image plane to be photographed may be contemplated to enable the lens shutter to open. However, to achieve complete shielding, large shielding members such as a pair of focal-plane shutters are required, thus rendering the structure complex.

The present invention enables adjustment of the focus by focusing the light rays which pass through the camera lens. The invention also provides that the image plane to be photographed is completely shielded by a simple method.

SUMMARY OF THE INVENTION

The above object is achieved in accordance with the teachings of the invention by a camera system whose focus is automatically adjusted and which has a lens shutter in the optical path of a camera lens, the lens being brought into focus by focusing the transmitted light. The camera system comprises a light-blocking member disposed ahead of the image plane to be photographed, a driving means which operates the lens when the camera is manually operated, and a sequential shutter control means. Usually, the shutter is closed to attenuate passing light. When the camera is manually operated, the shutter is opened, and the focus is automatically adjusted according to the light transmitted through the lens. When the shutter is subsequently closed, the light-blocking member is withdrawn, and the shutter performs its exposure operation.

DESCRIPTION OF THE PREFERRED EMBODIMENTS

Figure 1:
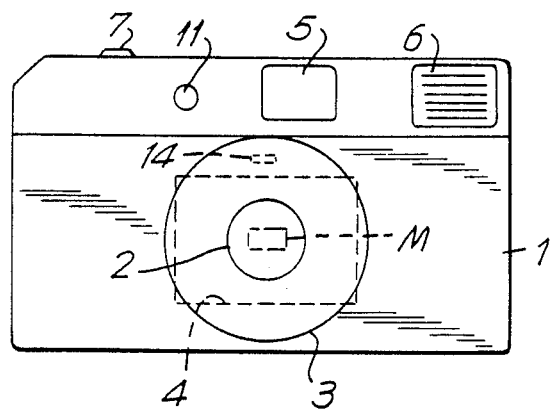
FIG. 1 is a front elevational view of a camera according to one embodiment of the invention.

One example of the invention will now be described in detail by referring to the accompanying drawings. Referring to FIG. 1, the body of a camera is indicated by numeral 1. The body 1 has a lens barrel 3 in which a camera lens 2 is mounted. An image of the subject is passed through the lens 2 and focused onto a photosensitive material F (hereinafter referred to as the film). The film F is located behind a region defined by the field of view 4.

A viewfinder 5 that indicates the limits of the field of view and a strobe 6 are mounted in the upper portion of the camera body. A shutter release 7 for setting the camera into operation is mounted on the top of the camera body.

Figure 2:
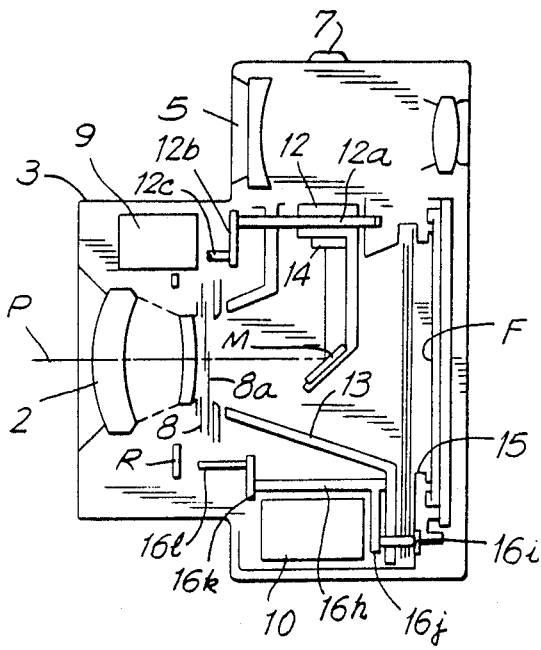
FIG. 2 is a cross-sectional view of the main portions of the camera.

FIG. 2 is a cross-sectional view of the main components of the camera. A lens shutter 8 which opens and closes the lens opening is mounted behind the lens 2. The shutter 8 has a shutter blade 8a that normally closes the lens opening.

A stepper motor 9 is disposed inside the lens barrel 3 and drives a known activating means D to bring the lens into a focal point and to open and close the blade 8a.

The activating means D that drives the lens 2 causes a helicoid mount to move the lens 2 toward the optical axis. The helicoid mount is driven by a ring R that rotates around the lens opening.

An electronic circuit 10 which controls the stepper motor 9 comprises a known motor-driving circuit, a sequential control circuit for controlling the timing at which the shutter is driven, and an illuminance-measuring circuit. Since all of these circuits are known, none of them are shown. The illuminance-measuring circuit includes a light-receiving device 11 which measures the illuminance on the subject. This structure is known and described in detail, for example, in Japanese Patent Laid-Open No. 200,339/1987.

A mirror M is inclined and held to a frame 12 on the optical axis P behind the lens 2. The mirror is rotatably held by a shaft 12a mounted below the viewfinder 5. The shaft 12a is held to a light-tight cylinder 13 which extends toward the film surface from the rear of the shutter 8. The whole outer surface of the cylinder 13 is made light-tight. An operation lever 12b and a pin 12c are mounted on the shaft.

The image from an object is reflected toward the viewfinder 5 by the mirror M. A sensor 14 is rigidly fixed to the frame 12 to detect the focus point equivalent to the film surface. The sensor 14 detects that the lens 2 is focused.

The sensor 14 is connected with a known automatic focusing detection circuit (not shown). An electromagnet 20 and the stepper motor 9 are actuated according to the output from the focusing detection circuit.

Figure 3:
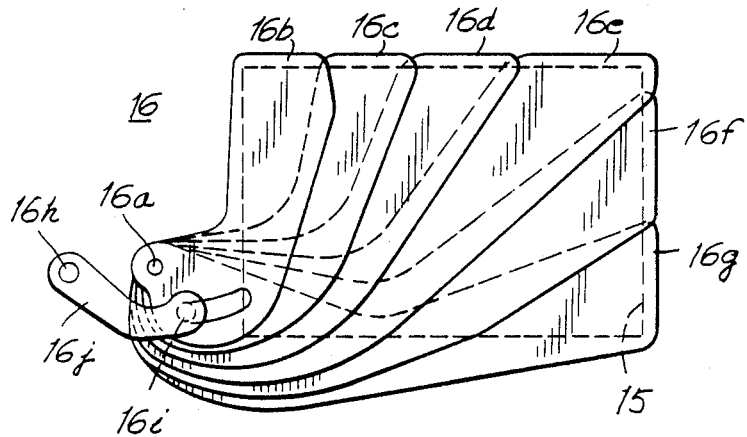
FIG. 3 is an enlarged portion of the light-blocking member.

A light-blocking member 16 is disposed between the light-tight cylinder 13 and a flange 15 defining the field of view. That is, the member 16 is located behind the cylinder 13. The flange 15 is positioned ahead of the film surface F. As shown in FIG. 3, the blocking member 16 comprises sectors 16b – 16g and an actuating lever 16j. The sectors 16b – 16g revolve about a pin 16a. The lever 16j turns around a shaft 16h. The sectors 16b – 16g have their respective grooves in which a pin 16i is fitted. A second actuating lever 16k is firmly fixed to the shaft 16h and has a pin 16l.

Figures 4, 5:
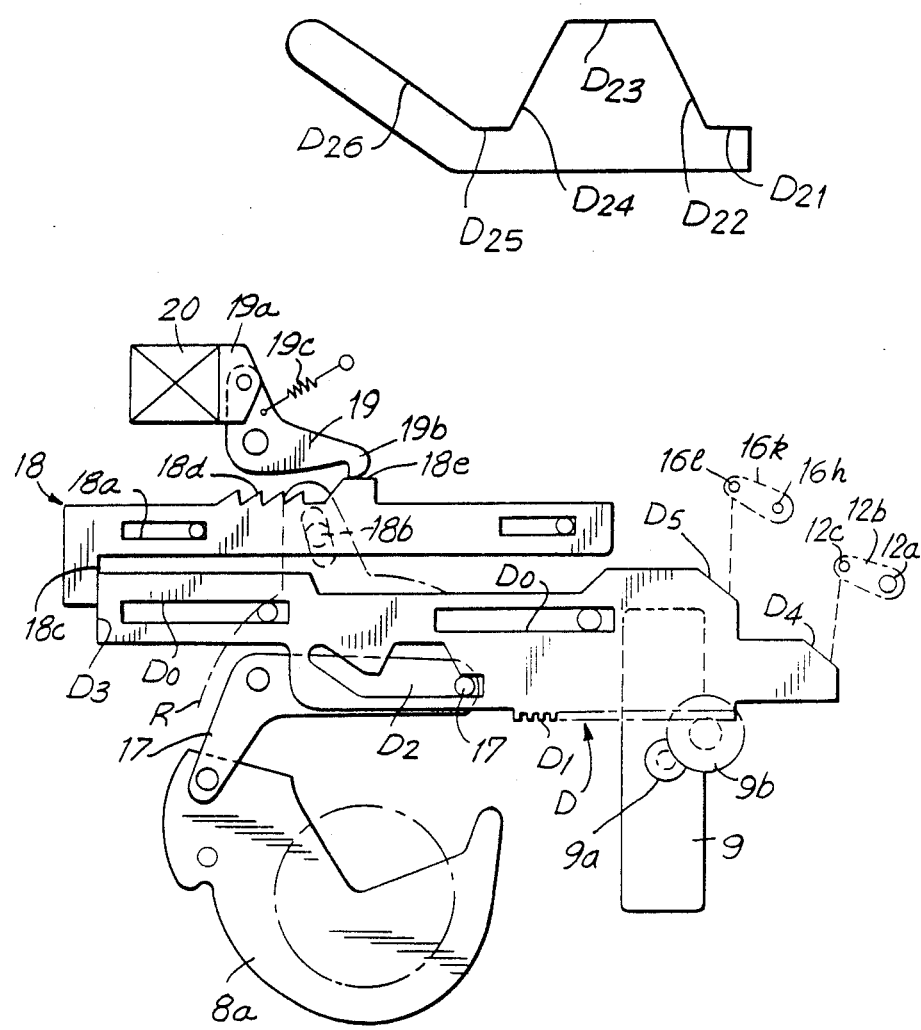
FIG. 4 is an expanded plan view of the main portions.
FIG. 5 is an enlarged view of the driving portion.

FIG. 4 shows main portions of the activating means D that is driven by the stepper motor 9. For simplicity, the members rotating around the lens opening are shown to be expanded onto a plane.

The shutter blade 8a which opens and closes the lens opening is engaged so as to be actuated by an opening lever 17. In FIG. 4, only one of a set of blades is shown. The lever 17 is biased to the left by a spring (not shown). An activating pin 17a is mounted at the right end of the lever 17.

The activating means D has grooves $D_0$ so as to be slidably held. The activating means D comprises teeth $D_1$, a cam portion $D_2$ for activating the activating pin 17a, a pressing portion $D_3$ at the left end, a first inclined surface $D_4$ engageable with the pin 12c on the lever 12b, and a second inclined surface $D_5$ engageable with the pin 16l on the actuating lever 16k. The teeth $D_1$ are driven by the stepper motor 9 via gears 9a and 9b.

A distance-setting member 18 has a groove 18a and is held so as to be slidable from side to side. The distance-setting member 18 comprises a pin 18b engaging with the ring R, an arm 18c engaging with the pressing portion $D_3$, a distance-setting step portion 18d, and a raised step portion 18e. The setting member 18 is biased to the right by a spring (not shown).

An armature lever 19 consists of an attracted member 19a and a retaining portion 19b. The member 19a is controlled and attracted to the electromagnet 20. The retaining portion 19b engages with the distance-determining member 18. The lever 19 is biased to the right by a spring 19c.

FIG. 5 is an enlarged view of the cam portion $D_2$ of the activating means D. The cam portion is shown to be comprised of cams $D_{21}$, $D_{22}$, $D_{23}$, $D_{24}$, $D_{25}$ and $D_{26}$. The cam $D_{21}$ locks the activating pin 17a against the action of a spring (not shown) to bring the shutter blade 8a into its closed position before the camera is operated. The cam $D_{22}$ moves the blade 8a into its open position when the operation of the camera is started. The cam $D_{23}$ maintains the blade 8a in its open state while automatic focusing adjustment is being made. The cam $D_{24}$ acts to return the blade 8a to its closed position. When the mirror M and the light-blocking member 16 are being withdrawn, the cam $D_{25}$ keeps the blade 8a in its closed position. The cam $D_{26}$ opens and closes the blade 8a for exposure operation.

The method of operating the camera is next described. Under the condition shown in FIG. 4, if the shutter release 7 is depressed to take a picture, the electronic circuit 10 is set into operation. The electromagnet 20 is energized to attract the attracted member 19a and thereafter the stepper motor 9 is rotated. This moves the activating means D to the right. The cam $D_{22}$ activates the lever 17 to move the shutter blade 8a from the illustrated first position to a second position where the lens opening is opened. Then, the optical path to the sensor 14 is open. As a result, the automatic focusing detection (AF) circuit is set into operation.

The sensor 14 receives the image of the subject transmitted through the camera lens 2. When the camera lens arrives at the optimum focus point, the AF circuit (not shown) stops the output from the sensor and deenergizes the electromagnet 20 by a known method.

More specifically, when the stepper motor 9 is driven, the activating means D shifts to the right. The arm 18c of the distance-determining member 18 follows the pressing portion $D_3$, and is moved to the right by a spring (not shown). The retaining portion 19b of the armature lever 19 is pushed by the raising step portion 18e and pressed against the electromagnet 20. Thus, the lever 19 is atracted and retained to the electromagnet 20. When the electromagnet 20 is deenergized at the focus point as described above, the armature lever 19 is rotated to the right by the spring 19c. The retaining portion 19b of the lever 19 engages the setting step portion 18d corresponding to the focus point of the lens 2. The ring R is thereby driven to set the lens 2 at the focus point.

Figure 6:
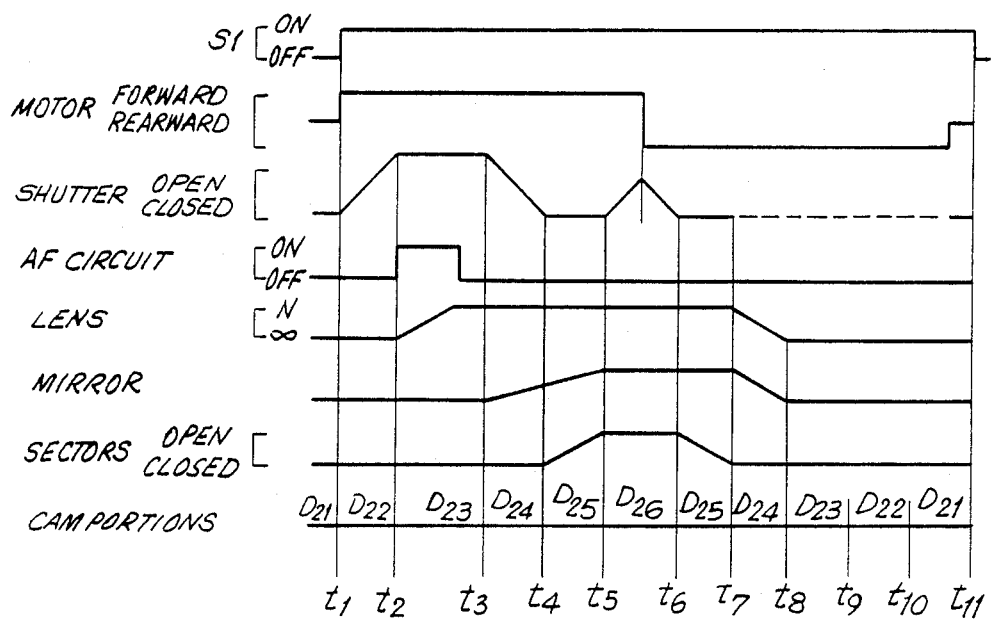
FIG. 6 is a sequential diagram illustrating the operation of the main components.

In the sequence diagram of FIG. 6, the operation is started after time $t_1$ elapses. The AF circuit begins to operate at instant $t_2$. The camera lens 2 is stopped. The illustrated condition is just prior to instant $t_3$.

The stepper motor 9 rotates further to move the activating means D to the right. The cam $D_{24}$ rotates the lever 17 to the right. The shutter blade 8a moves into the first position where the opening is closed. The first inclined surface $D_4$ activates the pin 12c of the operation lever 12b to rotate the mirror M about the shaft 12a. The mirror is moved out of the optical path of the lens 2 and the flange 15.

The pin 16l of the second activating lever 16k of the light-blocking member 16 is activated by the second inclined surface $D_5$. The activating lever 16j is rotated to the right about the shaft 16h. Thus, the pin 16l rotates the sectors 16b – 16g about the shaft 16a, thereby providing an opening at the flange 15. That is, the operation is complete at time $t_5$ as shown in FIG. 6.

Subsequently, the stepper motor 9 turns to move the activating means D further to the right. The cam $D_{26}$ activates the lever 17 to cause the shutter blade 8a to open the lens opening. Since the sectors 16b – 16g are withdrawn from the field of view at the flange 15, the film F is exposed to light. If a desired exposure amount is obtained by a known method, the motor 9 is reversed by the sequential control circuit. Then the exposure operation is completed. That is, the operation is complete at time $t_6$ as shown in FIG. 6.

If the stepper motor 9 further rotates counterclockwise, the sectors 16b – 16g return to their original positions where they cover the field of view at the flange 15 while the shutter blade 8a is closed. The mirror M goes back into the optical path. The blade 8a is driven by the cams $D_{24}$, $D_{23}$, $D_{22}$, $D_{21}$ and returns to the position in which it closes the opening. In this way, preparations for photography are complete.

In the above example, the opening lever 17 may be retained by a separate engaging means to permit the lever 17 to reach the cam $D_{21}$ while the shutter blade 8a is kept closed by the cam $D_{25}$ when the motor 9 is reversed. Another means may be provided to release the lever when the activating means D returns to its initial position.

Also in the above example, the exposure operation is performed by the lens shutter comprising the shutter blade 8a. It is also possible to fabricate the light-blocking member 16 from a focal-plane shutter. In this case, the cams $D_{24}$, $D_{25}$, and $D_{26}$ of the activating means D are unnecessary. The second inclined surface $D_5$ may start the focal-plane shutter with further delay.

In this case, if the ability of the focal-plane shutter to block light is relatively inferior, the function can be performed sufficiently because of the subject matter of the present invention. Therefore, the shutter can be made simple in structure.

The second inclined surface $D_5$ and the first inclined surface $D_4$ are provided to activate the light-blocking member 16 and the mirror M. They may be activated by other power means such as a motor or spring. In this case, the activating means D may be designed to be used only to start them.

Withdrawing the mirror M is independent of the subject matter of the invention. A known half mirror may be fixed. Further, the mirror M may perform the function of the light-blocking member 16. It may be moved out of the optical path during photography. The stepper motor 9 can take other forms such as an ultrasonic motor, as long as it can be rotated either forwardly or rearwardly.

In the above example, the lens opening is closed by the shutter blade 8a prior to operation. It is not necessary that the opening be totally closed. If the opening opens slightly, no problems occur, provided that light does not leak to the film F through the light-blocking member 16.

Also, a separate shutter blade performing the same function or other means such as a liquid crystal which attenuates light may be provided.

Where the sensor 14 cannot perform the automatic focus adjusting function, weak light from the strobe 6 may be projected to continue the operation.

As can be understood from the description made thus far, in accordance with the present invention, the light passing through the optical path of the camera lens is usually attenuated. The field of view 4 is shielded by the light-blocking member 16. During photography, the optical path is opened and the light transmitted through the lens is used to carry out an automatic focus adjusting operation. Errors intrinsic to individual cameras are accommodated. Consequently, focus control operation can be performed automatically with high precision. The field of view 4 is shielded by the sectors 16b – 16g only substantially immediately prior to the exposure operation and so the sectors 16b – 16g can be made simple in structure and small. The sectors can be fabricated from an inexpensive light-blocking member.

What I claim is:

1. In a camera system for use in a camera of the type having a lens with an optical axis and automatic focus adjusting means utilizing the light transmitted through the lens, the combination comprising:

a lens shutter operable while disposed along said optical axis;

a light-blocking means disposed ahead of the image plane to be photographed and moveable between blocking and non-blocking positions;

a driving means which operates the lens to effect automatic focusing of the lens utilizing the light transmitted through the lens; and a control mans which is operable upon manual actuation of the camera to open the shutter and provide for automatic focus adjustment utilizing the light transmitted through the lens and said shutter, said control means also being operable to move said light-blocking means to said blocking position when said shutter is opened to provide for said automatic focus adjustment and to subsequently move said light-blocking means to said non-blocking position to provide for exposure operation of said shutter to expose the film in the camera.

2. In a camera according to claim 1, wherein said control means is operable to maintain said light-blocking means in its blocking position during said automatic focusing and to maintain said light-blocking means in its non-blocking position during said exposure operation of said shutter to expose said film.

3. In a camera according to claim 1, wherein said shutter has a shutter actuation part, said control means comprising an activating means operably engageable with said shutter actuation part and also operably engageable with said light-blocking means to effect sequential operation of said shutter and said light-blocking means.

4. In a camera according to claim 3, wherein said activating means is moveable in one direction to open said shutter to provide for said automatic focusing and to provide for said exposure operation to expose said film.

5. In a camera according to claim 3, wherein said activating means comprises a motor-driven activator part having one cam portion operably engageable with said shutter actuation part and another cam portion operably engageable with said light-blocking means.

6. In a camera according to claim 5, wherein said camera is of the type having a mirror having one position in the optical path and another position out of the optical path, said mirror being in said optical path during said automatic focusing, said activator part having another cam portion operable to move said mirror from said one to said other position during said exposure operation of said shutter to expose said film.

7. In a camera according to claim 3 further comprising a distance-setting means for setting a focus point, said distance-setting means being operably engageable with said activating means during the setting of said focus point.

8. In a camera according to claim 1, wherein said control means is operable upon manual actuation of the camera to operate said shutter from a normally closed position to an open position and to initiate said automatic focusing after said shutter has operated to said open position, said control means also being operable to operate said shutter from said open to said closed position after said automatic focusing is completed, said control means maintaining said light-blocking means in its blocking position while said shutter is open during said automatic focusing.

9. In a camera according to claim 8, wherein said control means is subsequently and subsequentially operable to operate said light-blocking means to its non-blocking position and to maintain said non-blocking position as said control means effects exposure operation of said shutter to expose the film in the camera, said control means further being operable to operate said light-blocking means to said blocking position after completion of said exposure operation.

10. In a camera system for use in a camera of the type having support structure supporting a lens and automatic focus adjusting means utilizing the light transmitted through the lens, the combination comprising:

a lens shutter means comprising a shutter support moveably supporting shutter parts, said shutter support being mounted in a fixed position on said support structure;

a light-blocking means disposed ahead of the image plane to be photographed and moveable between blocking and non-blocking positions;

a driving means which operates the lens to effect automatic focusing of the lens utilizing the light transmitted through the lens; and a control means which is operable upon actuation of the camera to open said shutter parts and provide for automatic focus adjustment utilizing the light transmitted through the lens, said control means also being operable to move said light-blocking means to said blocking position when said shutter is opened to provide for said automatic focus adjustment and to subsequently move said light-blocking means to said non-blocking position to provide for exposure operation of said shutter pats to expose the film in the camera.

11. In a camera system for use in a camera of the type having a lens defining an optical path and automatic focus adjusting means utilizing the light transmitted through the lens, the combination comprising:

a lens shutter means comprising a shutter support moveably supporting shutter parts, said shutter support being disposed along said optical path;

a light-blocking means disposed ahead of the image plane to be photographed and moveable between blocking and non-blocking positions;

a driving means which operates the lens to effect automatic focusing of the lens utilizing the light transmitted through the lens; and a control means which is operable upon manual actuation of the camera to open said moveable shutter parts while said shutter support is disposed along said optical path and provide for automatic focus adjustment utilizing the light transmitted through the lens, said control means also being operable to move said light-blocking means to said blocking position when said moveable shutter parts are opened to provide for said automatic focus adjustment and to subsequently move said light-blocking means to said non-blocking position to provide for exposure operation of said shutter parts to expose the film in the camera.

* * * * *